F. MARJANKO & M. GRUSCHKA.
MACHINE FOR THE PRODUCTION AND INSERTION OF SPRINGS IN PRESS BUTTONS.
APPLICATION FILED FEB. 27, 1914.

1,128,473.

Patented Feb. 16, 1915.
6 SHEETS—SHEET 1.

F. MARJANKO & M. GRUSCHKA.
MACHINE FOR THE PRODUCTION AND INSERTION OF SPRINGS IN PRESS BUTTONS.
APPLICATION FILED FEB. 27, 1914.

1,128,473.

Patented Feb. 16, 1915.
6 SHEETS—SHEET 2.

F. MARJANKO & M. GRUSCHKA.
MACHINE FOR THE PRODUCTION AND INSERTION OF SPRINGS IN PRESS BUTTONS.
APPLICATION FILED FEB. 27, 1914.

1,128,473.

Patented Feb. 16, 1915.

ns: and: 
UNITED STATES PATENT OFFICE.

FERDINAND MARJANKO AND MAX GRUSCHKA, OF PRAGUE, AUSTRIA-HUNGARY.

MACHINE FOR THE PR' JCTION AND INSERTION OF SPRINGS IN PRESS-BUTTONS 1,128,473.　　　Specification of Letters Patent.　　Patented Feb. 16, 1915.

Application filed February 27, 1914. Serial No. 821,482.

*To all whom it may concern:*

Be it known that we, FERDINAND MARJANKO and MAX GRUSCHKA, subjects of the Emperor of Austria-Hungary, and residing at Königliche Weinberge, Prague, Bohemia, Austria-Hungary, have invented certain new and useful Improvements in Machines for the Production and Insertion of Springs in Press-Buttons, of which the following is a specification.

The object of the present invention is a machine for inserting springs into press-buttons which differs from the known machines of this kind by the construction of the dies for the tools shaping the spring, and for bending a part of the edge of the press-button for the purpose of securing the spring in the press-button as to form a single tool.

A further likewise very important feature of the invention is contained in the traveling conveyer frames which in themselves form tools and in the distribution of the press-buttons on the same, which permits of the springs being inserted simultaneously in all or in part of the press-buttons.

The subject of the invention is shown by way of example in the drawings.

Fig. 2 is a side elevation of same, and Fig. 3 a vertical section on line A—B of Fig. 1, Fig. 5 shows a longitudinal section on lines C—D of Fig. 4, Figs. 6–8 show, in plan, the tools which produce the springs, in their positions before and after same are produced respectively.

Figure 4:
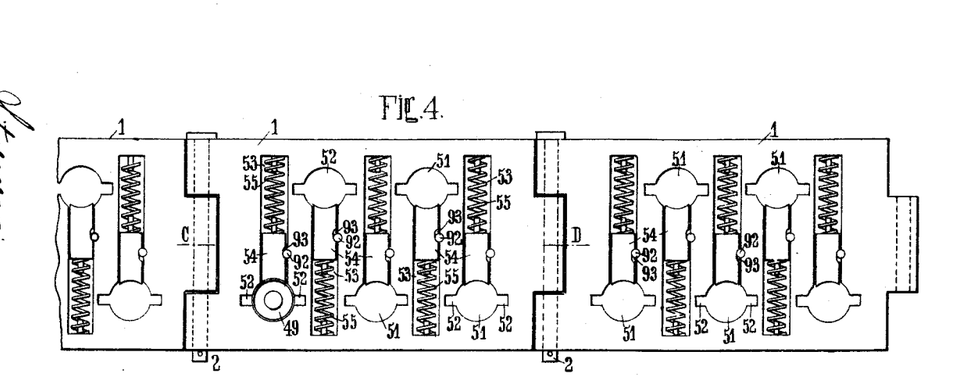
Fig. 4 shows a plan view to a larger scale of a portion of the conveyer band with press-buttons laid in the same.
Figure 5:
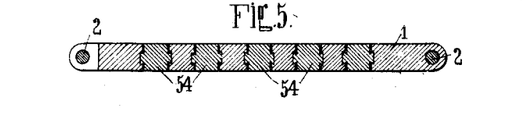

The conveyer device consists, as Fig. 4 shows, of an endless band, the frame-shaped links of which, in which the press-buttons are laid, are pivotally connected to one another by means of hinge bolts 2 in the same manner as the links of a flan-link chain. For guiding this conveyer band or chain, two chain wheels 3, 3' are provided. The latter are polygonal, each side of the polygon being of the same length as one of the frame-shaped links of the conveyer band, the chain wheels 3, 3' being mounted on the rotatable shafts 4, 4' respectively. On the shaft 4 the star-wheel 5 is fixed, this star-wheel being provided with slots 6. Below the chain-wheel 3 there is provided the driving shaft 7, which is journaled at 8, said shaft having rigidly mounted on it the driving belt-pulley 9. Shaft 7 carries the crank arm 10 which is provided with a crank pin 11. The length of the crank arm 10 is so chosen that in the course of a complete revolution of the crank pin 11 in the direction of the arrow 12, it engages with one of the slots 6, and in this manner imparts a part of a revolution in the direction of the arrow 13 to the star-wheel 5 and therefore also to the shaft 4.

The shaft 15 is journaled at 14, 14. On said shaft is rigidly mounted the bevel-wheel 16 which gears with the bevel-wheel 17 of the shaft 7. On the shaft 15 are also rigidly mounted the two pinions 18 and 19 which transmit the rotation of the shaft 15 by means of chains 20, 21 to the wheels 22 and 23 of the shafts 24 and 25 respectively. Said shafts 24, 25 which are journaled at 26 and 27 actuate the devices for producing the springs by means of their cams 28 and 29, as will be shown below. On shaft 15 there is also rigidly mounted the pinion 30 which transmits its rotation by means of the chain 31 to the pinion 32 of shaft 33. On shaft 33 the gear-wheel 34 is rigidly mounted which gears with the gear-wheel 35 of shaft 36. On shafts 33 and 36 (Fig. 3), the two feeding cams 37 and 38 are rigidly mounted which are so formed that only one half of their periphery operates so as to effect the feeding forward of the wire 39, The wheel 40 fixed to shaft 15 transmits by means of a chain 41 its rotation to the wheel 42 on the shaft 43. Parallel to the shaft 43 is journaled the shaft 44 and the rotation of shaft 43 is transmitted to shaft 44 by means of the pinions 45 and 46. The cams 47 and 48 on the shafts 43 and 44 respectively are provided for actuating the devices which effect the inserting of the springs.

Each link of the conveyer band or chain is arranged to receive a group of press-buttons in which the springs are to be inserted. The number of press-buttons belonging to each group can be optional. In the present case, as best shown in Fig. 4, each frame-shaped link is arranged to receive a group of five press-buttons. These press-buttons 49 which are to be provided with springs are, before the springs are inserted, of the form shown in Fig. 9 which is obtained by means of known stamping machines.

Figure 9:
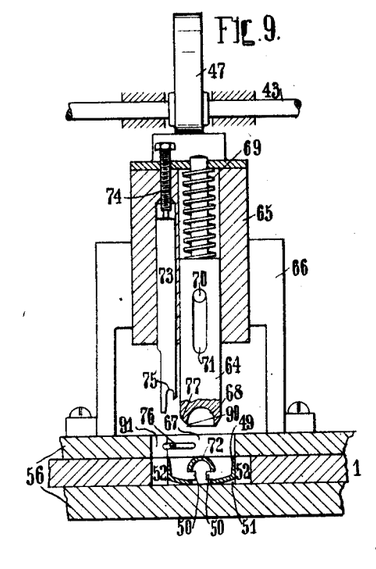
Figs. 9–12 show to a larger scale the tool for inserting one of two finished springs in the press-button, these figures showing the process in several of its phases.

As can be seen from Fig. 9, the press-button is of a hollow cylindrical form with a slightly convexed bottom, said bottom having at its center an upwardly directed dome-shaped protuberance or cap. This dome-shaped protuberance or cap 72 is provided with the two slots 50 in which the springs which are made from the wire 39, as will be explained later, are inserted.

The apertures 51 provided in the frame or link 1 serve to receive the press-buttons 49. Said apertures 51 are provided with oppositely disposed recesses 52 (Fig. 4). Slots 53 open into the apertures 51 and blocks 54 are slidably mounted by means of dovetails in the slots 53, said blocks 54 being under the action of springs 55. The said springs tend to press the block 54 against the press-buttons and in this manner to hold the press-buttons securely in the apertures 51. The forward movement of the blocks is limited by pins 92 which engage in recesses 93 in the blocks. The press-buttons 49 are placed in the apertures 51 in such a manner that their slots 50, 50 lie opposite the recesses 52.

The tool for forming the springs is arranged above the conveyer chain 1, and consists substantially of two members 57, 58 slidably mounted in a table 56, the ends of the members 57, 58 being shaped to correspond to the shape of the spring which has to be formed so that the member 57 working together with the member 58 (Fig. 8) produces the required shape for the spring. The members 57 and 58 are actuated by the above mentioned cams 28 and 29 as also by the springs 59 and 60 respectively. While the cams 28 and 29 tend to push the members 57 and 58 into the positions shown in Fig. 7, the springs 59 and 60 tend to press the members 57 and 58 against the cams, thus tending to bring said members to their original position.

The wire 39 which serves for making the spring is guided in the table 56 and also in an adjustable and exchangeable part or cutter 62, the edge 78 of which is instrumental later in the cutting off of the spring. With the table 56 is combined a deflector 63 which serves to deflect inwardly the end of the wire 39 pushed forward into the position shown in Fig. 6 before said wire is engaged by the specially shaped ends of the members 57, 58. If now the member 57 is pushed forward in the position shown in Fig. 6, and the member 58 in that shown in Fig. 7, the wire is bent by the nose of the member 58 into the forked end of the other member 57, so that the bending of the wire to form the spring 76 takes place between the two specially shaped ends of the members 57 and 58. If now the members 58, 57 again resume their original positions, the stop-pin 61, which is rigidly or resiliently and adjustably or exchangeably connected to the table 56 or the part 62, prevents the spring from being bent away. The finished spring 76 which is still connected to the wire 39 is in the position shown in Fig. 8, namely above the press-button 49 in which it is to be inserted.

The tool for inserting the springs in the press-buttons consists of the stamps 64, 73. The stamp 64 is slidably mounted in a slide 65 in such a manner that it can yield backward. The slide is guided by a standard 66 arranged on the table 56. In the table 56 are provided the openings 67 which correspond to the recesses 52 in the links 1 of the conveyer chain. The stamp 64 which is subjected to the action of the spring 69 is limited in its stroke by the guiding pin 70 which engages in the corresponding slot 71 in the stamp. At its lower end the stamp is provided with a cup-shaped hollow 68, which is so dimensioned that, when the stamp travels downward it embraces the cap of the press-button either entirely or partly and in this manner presses the press-button against the table. The hollow 68 may be made so as to exactly fit the cap of the press-button, in which case, however, the lower edge of the stamp must reach only as far as the slots 50, or said hollow 68 may be so made as not to correspond exactly to the press-button cap, but may be higher than the latter. In this latter case, the hollow 68 has at its bottom edge a set-back at 90 (Fig. 13) which corresponds exactly to the slot 50 of the press-button cap and serves the purpose of keeping the path free for the spring to enter into the slot 50 and guiding same into its place, when the stamp 73 is inserting the spring into the press-button. The stamp 73, which is also movably mounted in the slide 65 and which is adjustable by means of the screw 74, is at the same time constructed as a cutter, that is, it looks after the cutting off of the spring from the main wire as well as the work of inserting the spring and the bending over of a portion of the press-button edge after the spring has been inserted in the press-button and cut off from the main wire. For engaging the spring and cutting it off from the main wire 39 and for bending the spring down this stamp is provided at the bottom with the notch 75 (Fig. 9). This notch has a sharp cutting edge which serves for cutting off the spring formed by the members 57 and 58 (Figs. 6 and 8) immediately before the insertion of the spring into the press-button takes place.

Figure 10:
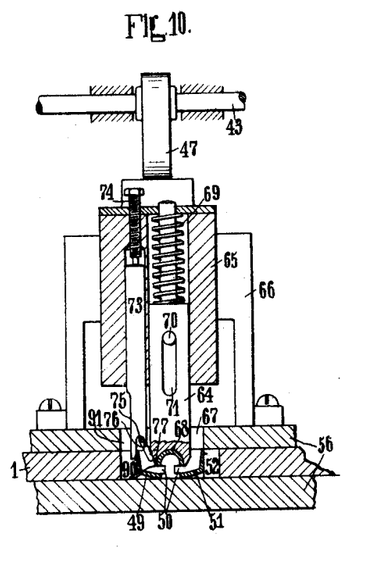
Figure 11:
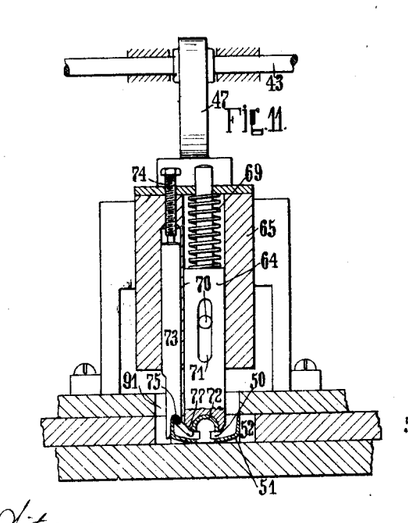
Figure 12:
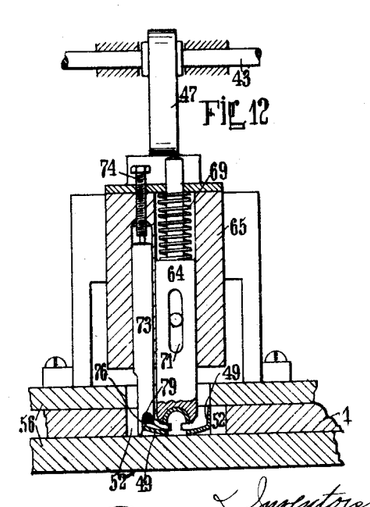
Figure 14:
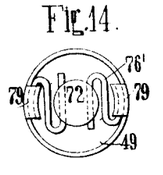
Figs. 14—15 show to a larger scale in plan and in section respectively the press-button provided with springs before the edge of the press-buttons has been finally bent over.
Figure 15:
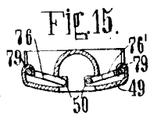

The slide 65 is pressed downwardly together with the stamps 64 and 73 by means of the cam 47, until the bottom edge of the stamp 64 bears on the previously formed spring 76 which is still in one piece with the main wire 39. On the stamp 64 now continuing its downward course the inner free end of the spring 76 is deflected downward (Fig. 10), the other end of the spring 76 still remaining attached to the wire 39, which is kept in place by the part 62. On the stamp 64 traveling still farther downward, it embraces the press-button cap 72 and finally presses the press-button down on to the table 56 whereby the press-button is held immovably in its place. If now the slide 65 continues to travel farther downward, the stamp 73 arrives by way of the slot 91 in the machine bed into the slot 52 of the conveyer frame. In so doing, the stamp 73 engages the spring 76 by means of its notch 75, cuts the spring at the edge 78 (Figs. 6-8) of the adjustable piece 62 from the main wire, and when the slide arrives at the bottom of its stroke, bends over the edge of the press-button at 79 (Figs. 12 and 14—15) to an extent equivalent to the breadth of the stamp 73, the inner end of the spring 76 slips into the slot 50 of the press-button cap 72, so that the spring is held securely in place by the bent-over edge of the press-button and by the said slot 50 of the press-button cap. With the tool described herein, a sure and exact insertion of springs into groups of press-buttons is attained, since, owing to the fact that the springs are held by the wire 39 until they are completely inserted in the press-buttons, the springs are prevented from springing out or from being distorted in any way.

Figure 13:
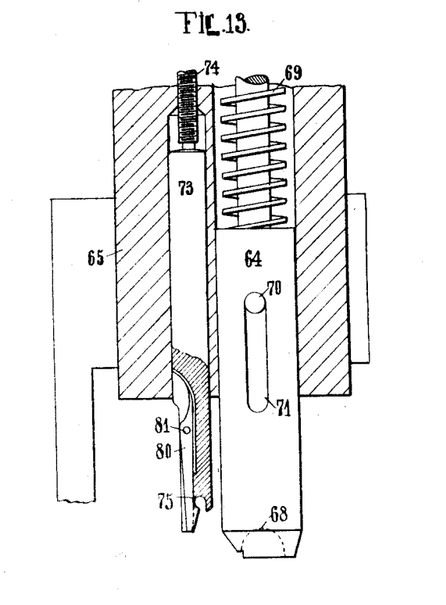
Fig. 13 shows to a larger scale a somewhat modified form of construction of the tool which effects the inserting of the spring.

In Fig. 13 a modified form of construction of the tool is shown in vertical section to a larger scale. This form differs from that just described only therein that the stamp 73 is provided with a resiliently arranged part 80 which is pivotally mounted on a bolt 81 of the said stamp 73 and is so arranged that it produces a side press re on the spring 76, while the latter is being inserted into the press button.

Figure 6:
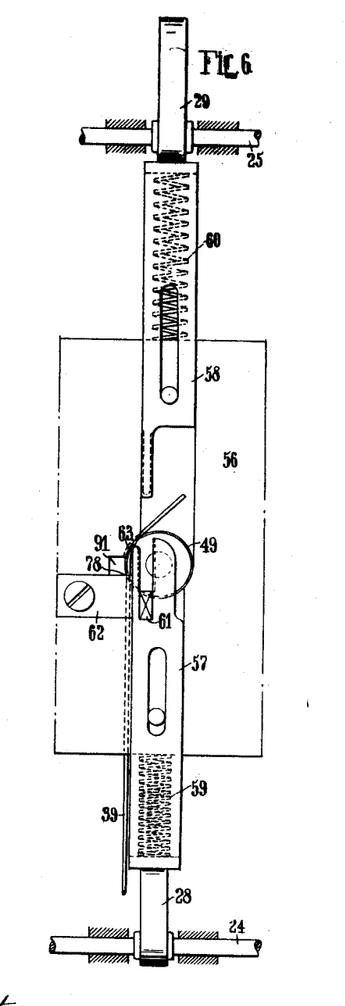
Figure 7:
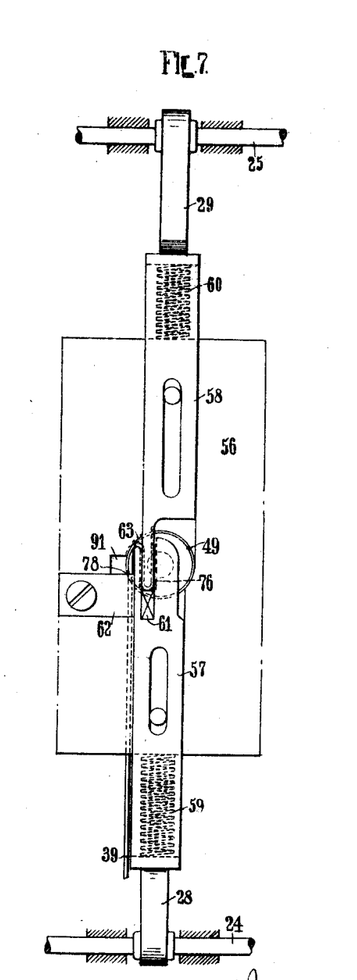
Figure 8:
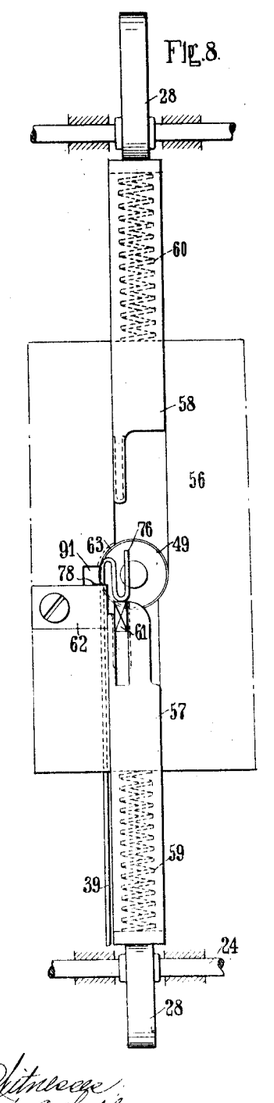

When the conveyer-band made up of the frames or links 1 filled with press-buttons arrives at the tools for the formation and the insertion of the springs (Fig. 1), the springs are, according to the example now under consideration, formed and inserted on one side of the press-buttons at the five points designated $a, b, c, d, e,$ the procedure being as follows:—The main shaft 7 first of all causes the wires 39 to be fed forward, then the members 57 and 58 to be brought into the positions shown in Figs. 6 and 7 respectively, then removed from said positions and finally it causes the slide 65 (Figs. 9–12) to be actuated. For this purpose the cams 37, 38 which effect the feeding forward of the wire 39, as also the cams 28 and 29 which actuate the members 57 and 58 and finally the cams 47 which actuate the slides 65 are all correspondingly displaced with relation to one another. As soon as the wires 39 have been fed forward, and the springs 76 have been formed and inserted in the press-buttons at the working points $a$ to $e$, the crank pin 11 of the crank arm 10 again engages one of the slots 6 of the star-wheel 5 and revolves the star-wheel one stage farther in the direction of the arrow 13. Hereby each of the frames 1 is moved forward a corresponding distance whereby any press-buttons which are not yet provided with springs are brought to the working positions $a$ to $e$.

Figure 1:
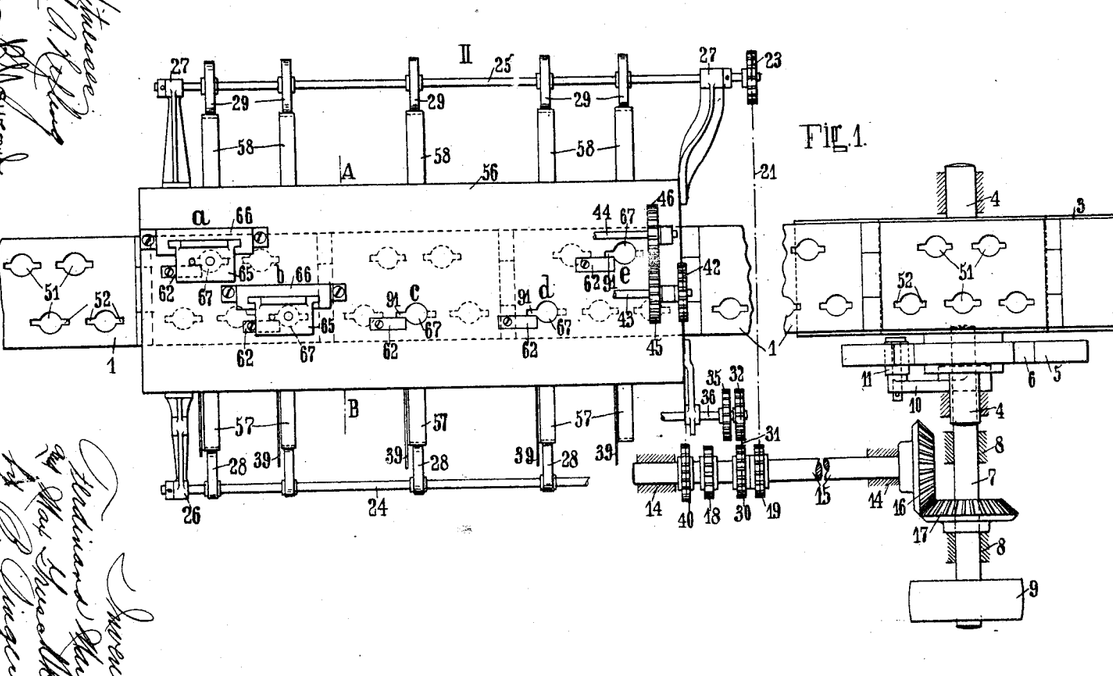
Figure 1 shows a plan view of the general arrangement, that is, of the conveyer band and of the tools serving for the production and insertion of the springs.
Figures 2, 3:
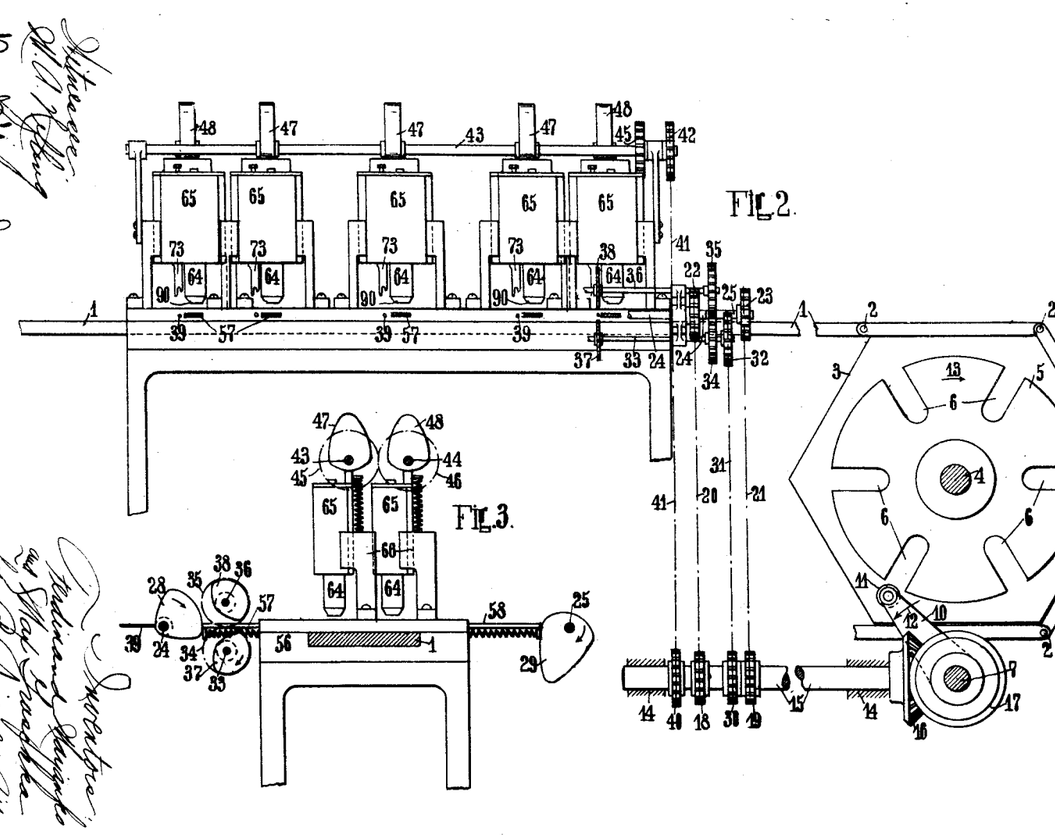

By the apparatus shown in Figs. 1 and 2, the press-buttons are of course provided with springs only on one side. The apparatus which serves for producing and inserting the springs on the other side of the press-buttons can of course be arranged in exactly the same manner, but with the difference that the wires 39 are led in from the opposite side to that shown in Fig. 1 and that the slidably mounted members 57 and 58 are correspondingly changed about, and the stamp 73 is arranged on the opposite side of the stamp 64.

Figure 16:
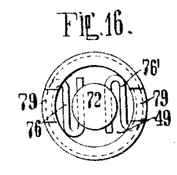
Figs. 16—17 show to a larger scale in plan and in section respectively the finished press-button provided with springs after the edge of the press-button has been finally bent over.
Figure 18:
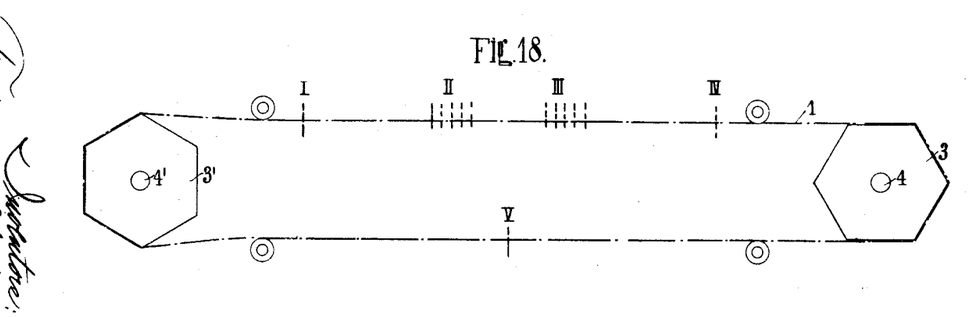
Fig. 18 shows in diagrammatic form a side view of the two conveyer chain wheels with the conveyer band or chain, the various working positions being shown by Roman numerals.

As shown diagrammatically in Fig. 18, the press-buttons which have been stamped out by means of known machines are laid in by hand or by mechanical means in the openings 51 of the links or frames forming the conveyer-chain, at I. On the conveyer being moved forward they then arrive at the tools which, as above described, produce and insert the springs in the press-buttons. This, as shown in Fig. 16 takes place at the positions II and III, when the conveyer is at rest, the springs being made and inserted on one side of the press-buttons at II and on the opposite side at III.

Figure 17:
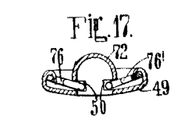

After the press-buttons have thus been completed, they are re-inserted into the openings 51 of the links forming the conveyer chain by the stamping tool and conveyed to the working position V, where they are pushed out of the frames by means of stamps arranged in groups. The press-buttons thus pressed out of the frame are, as Figs. 16 and 17 show, provided with springs 76, 76' on both sides and are then ready for use.

Having now described our invention what we claim as new and desire to secure by Letters Patent is:—

1. In a machine for the production and insertion of springs in press-buttons, the combination of a machine-bed, a conveying means provided with apertures arranged to receive the press-buttons, two stamps slidably mounted in the machine-bed having specially shaped ends working together to form the spring above the machine-bed, a slide mounted slidably and vertically with regard to both the said stamps above the conveying means, said slide carrying a third stamp resiliently and slidably mounted in the same, said third stamp being provided at the bottom with a cup-shaped depression and arranged in such a manner that when the slide moves downward, the third stamp bends one side of the spring formed by the two first mentioned stamps downward into the press-button, means for cutting the spring off the wire from which said spring is made, and for pressing the spring thus cut off into the press-button and for bending over a part of the edge of the press-button.

2. In a machine for the production and insertion of springs in press-buttons, the combination of a machine-bed, a conveying means provided with apertures arranged to receive the press-buttons, two stamps slidably mounted in the machine-bed having specially shaped ends working together to form the spring above the machine-bed, a slide mounted slidably and vertically with regard to both the said stamps above the conveying means, a third stamp carried by said slide resiliently and slidably mounted in the same, said third stamp being provided at the bottom with a cup-shaped depression and arranged in such a manner that when the slide moves downward, the third stamp bends one side of the spring formed by the two first mentioned stamps downward into the press-button and a fourth stamp rigidly connected to said slide provided at the bottom with a notch, a cutter coöperating with said notch secured to the machine-bed for cutting the spring off the wire from which said springs are made, said fourth stamp pressing the remaining side of the spring thus cut off into the press-button and bending over it a part of the edge of the press-button.

3. In a machine for the production and insertion of springs in press-buttons, the combination of a machine-bed, a conveying means provided with apertures arranged to receive the press-buttons, two stamps slidably mounted in the machine-bed having specially shaped ends working together to form the spring above the machine-bed, a slide mounted slidably and vertically with regard to both the said stamps above the conveying means, a third stamp carried by said slide and resiliently and slidably mounted in the same, said third stamp being provided at the bottom with a cup-shaped depression and arranged in such a manner that when the slide moves downward, the third stamp presses on the press-button and at the same time bends one side of the spring formed by the two first mentioned stamps downward into the press-button and means for cutting the spring off the wire from which said spring is made, and for pressing the spring thus cut off into the press-button and for bending over a part of the edge of the press-button, a means rigidly connected to said slide and having a resilient part arranged in it which is pivotally mounted so as to swing about a pivot and serving to hold the spring in place until it is pushed back by the press-button edge which then keeps the spring in its place.

4. In a machine for the production and insertion of springs in press-buttons, the combination of a machine-bed, a conveying means provided with apertures arranged to receive the press-button, two stamps slidably mounted in the machine-bed having specially shaped ends which work together to form the spring above the machine-bed, a slide mounted slidably and vertically with regard to both the said stamps above the conveying means, a third stamp carried by said slide and resiliently and slidably mounted in the same, the said third stamp being provided at the bottom with a cup-shaped depression and arranged in such a manner that when the slide moves downward, the third stamp bends one side of the spring formed by the two first mentioned stamps downward into the press-button, means for cutting the spring off the wire from which said spring is made, and for pressing the spring thus cut off into the press-button and for bending over a part of the edge of the press-button, means for actuating the first two stamps and means for actuating the slide in periodical succession.

5. In a machine for the production and insertion of springs in press-buttons, the combination of a machine-bed, a conveying means provided with apertures arranged to receive the press-button, two stamps slidably mounted in the machine-bed having specially shaped ends working together to form the spring above the machine-bed, a slide mounted slidably and vertically with regard to both the said stamps above the conveying means, a third stamp carried by said slide resiliently and slidably mounted in the same, said third stamp being provided at the bottom with a cup-shaped depression and arranged in such a manner that when the slide moves downward, the third stamp bends one side of the spring formed by the two first mentioned stamps downward into the press-button and means for cutting the spring off the wire from which said spring is made, and for pressing the spring thus cut off into the press-button and for bending over a part of the edge of the press-button, said conveying means being arranged as an endless chain, the individual links of which form work holding means, and means for moving the endless conveying device intermittently.

6. In a machine for the production and insertion of springs in press-buttons, the combination of a machine-bed, a conveying means provided with apertures arranged to receive the press-button, two stamps slidably mounted in the machine-bed having specially shaped ends working together to form the spring above the machine-bed, a slide mounted slidably and vertically with regard to the two said stamps above the conveying means, a third stamp carried by said slide resiliently and slidably mounted in the same, said third stamp being provided at the bottom with a cup-shaped depression and arranged in such a manner that when the slide moves downward, the third stamp bends one side of the spring formed by the two first mentioned stamps downward into the press-button and means for cutting the spring off the wire from which said spring is made, and for pressing the spring thus cut off into the press-button and for bending over a part of the edge of the press-button, the said conveying means being arranged as an endless chain, the individual links of which consist of frames, means for moving the endless conveying device intermittently, said frames being provided with a group of apertures, said apertures being provided with oppositely disposed recesses, a slot opening into said apertures, blocks slidably mounted in said slots, said blocks being under the action of springs and pressing against the press-buttons and holding them securely in the apertures.

7. In a machine for the production and insertion of springs in press-buttons, the combination of a machine-bed, a conveying means provided with apertures arranged to receive the press-buttons, two stamps slidably mounted in the machine-bed having specially shaped ends working together to form the spring above the machine-bed, a slide mounted slidably and vertically with regard to both the said stamps above the conveying means, a third stamp carried by said slide resiliently and slidably mounted in the same, said third stamp being provided at the bottom with a cup-shaped depression and arranged in such a manner that when the slide moves downward, the third stamp bends one side of the spring formed by the two first mentioned stamps downward into the press-button and said third stamp being provided with a notch intended to keep free for the free end of the spring only the entrance into the slot of the press-button cap when the spring is being inserted in the press-button, a fourth stamp carried by said slide and rigidly connected with it, said fourth stamp provided at the bottom with a notch, a cutter secured to the machine-bed coöperating with said notch for cutting the spring off the wire from which said springs are made, the fourth stamp then pressing the remaining side of the spring thus cut off into the press-button and bending over a part of the edge of the press-button.

8. In a machine for the production and insertion of springs in press-buttons, the combination of a machine-bed, a conveying means provided with apertures arranged to receive the press-buttons, two stamps slidably mounted in the machine-bed having specially shaped ends working together to form the spring above the machine-bed, a stop pin serving to prevent the springs from being bent away, a slide mounted slidably and vertically with regard to both the said stamps above the conveying means, a third stamp carried by said slide and resiliently and slidably mounted in the same, the said third stamp being provided at the bottom with a cup-shaped depression and arranged in such a manner that when the slide moves downward, the third stamp presses on the press-button and at the same time bends one side of the spring formed by the two first mentioned stamps downward into the press-button and means for cutting the spring off the wire from which said spring is made, means for pressing the spring thus cut off into the press-button and means for bending over a part of the edge of the press-button.

9. In a machine for the production and insertion of springs in press-buttons, the combination of a machine-bed, a conveying means provided with apertures arranged to receive the press-buttons, two stamps slidably mounted in the machine-bed having specially shaped ends working together to form the spring above the machine-bed, a slide mounted slidably and vertically with regard to the two said stamps above the conveying means, a third stamp carried by said slide and resiliently and slidably mounted in same, said third stamp being provided at the bottom with a cup-shaped depression and arranged in such manner that when the slide moves downward, the third stamp bends one side of the spring formed by the two first mentioned stamps downward into the press-button and means for cutting the spring off the wire from which said spring is made, means for pressing the spring thus cut off into the press-button and for bending over a part of the edge of the press-button, a means carried by said slide, said aperture in the conveying means being provided with recesses of such dimensions, that said last named means can enter into one of said recesses, a slot opening into said aperture, a spring actuated block slidably mounted in said slot, said spring tending to press the block against the press-button so as to hold the press-button securely in the aperture.

In testimony whereof we have signed our names to this specification in the presence of two subscribing witnesses.

FERDINAND MARJANKO.
MAX GRUSCHKA.

Witnesses:
 WOLDEMAR HAUPT,
 HENRY HASPER.